United States Patent Office 3,233,318
Patented Feb. 8, 1966

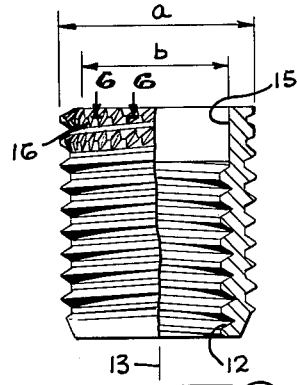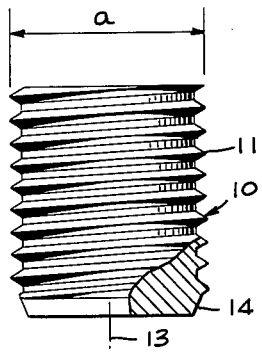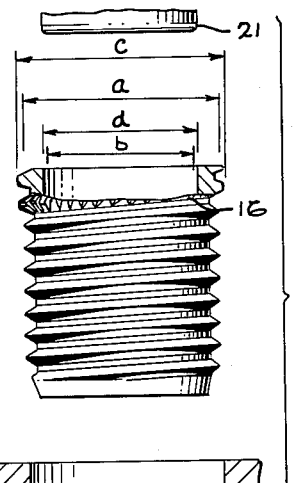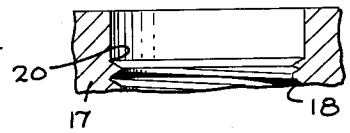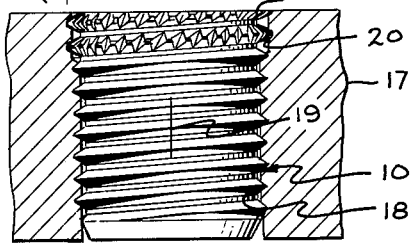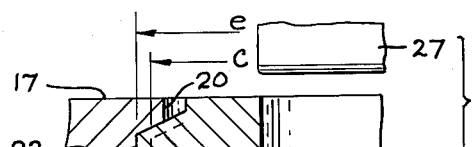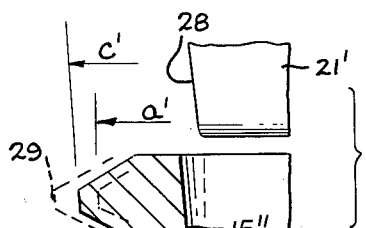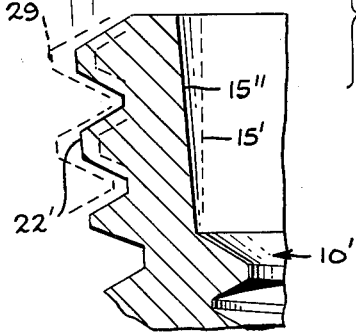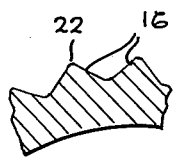

3,233,318
FORMATION AND INSTALLATION OF THREADED INSERTS
Robert Neuschotz, 1162 Angelo Drive, Beverly Hills, Calif.
Filed Feb. 12, 1963, Ser. No. 257,912
3 Claims. (Cl. 29—432)

This invention relates to an improved process for installing threaded inserts within a carrier part, and to the structure of the inserts thus installed.

The inserts with which the invention is concerned are of a type having external threads adapted to be screwed into a threaded passage in a carrier part, with a portion of these threads being serrated, typically by knurling, for expansion radially outwardly against the carrier part after installation in a manner locking the insert against unscrewing rotary motion. A major object of the invention is to provide a process for preventing accidental unscrewing of the insert from the carrier part prior to the final expansion of the serrated portion of the threads into locking position. Particularly contemplated is a method for frictionally retaining the insert against unscrewing movement while an installing tool is being unscrewed from the insert, after the tool has been actuated to drive the insert to its installed position.

The desired result is attained by pre-expanding the serrated portion of the insert threads to a diameter slightly greater than other portions of the threads, so that the serrations must necessarily engage the wall of the coacting carrier part with substantial friction, which may be predetermined to be of a value preventing undesired unscrewing rotation of the insert as a result of any and all forces which may normally be encountered during an installing operation. Preferably, all of the external threads of the insert are first formed to a common diameter, with the selected portion of the threads then being serrated, following which the serrated threads may be expanded slightly to the discussed increased diameter condition for attaining a chosen amount of frictional interlocking resistance by engagement with the carrier part. After the insert has been screwed to its installed position, the applying tool may be removed, and the final expanding operation may be performed to complete the permanent interlock between the insert and carrier part.

The above and other features and objects of the invention will be better understood from the following detailed description of the typical embodiments illustrated in the accompanying drawing in which:

FIG. 1 is a partially sectional and partially elevational view showing an insert embodying the invention as it appears at a first stage of manufacture;

FIG. 2 shows the same insert in elevation, after a second step of the present process has been performed;

FIG. 3 shows the insert after the third step of the process;

FIG. 4 illustrates the insert after having been screwed into the carrier part;

FIG. 5 shows the insert fragmentarily, after the final expanding operation;

FIG. 6 is a fragmentary section taken on line 6—6 of FIG. 2; and

FIG. 7 is a fragmentary enlarged sectional view showing a second form of insert constructed in accordance with the invention.

Referring first to FIG. 1, I have illustrated in that figure at 10 an insert constructed in accordance with the invention, as the insert appears prior to the serrating operation. The insert 10 may at this stage consist simply of a solid piece of metal bar stock on which have been formed external threads 11 centered about a main axis 13 of the device. The external threads may be of uniform diameter along their length, except for the provision of a chamfer 14 which may be formed at the axially inner end of the device, for facilitating initial insertion of the insert into a carrier part.

After formation of external threads 11, the next step may be to serrate the axially outer end portions of threads 11 (preferably the two end turns of the threads), typically by means of a knurling tool, to form a series of fairly closely spaced irregularities or teeth or serrations such as are designated 16 in FIGS. 2 and 6. As illustrated, the knurling operation may act to widen the serrated threads axially to a certain extent.

Following the knurling operation, the insert is internally bored and tapped, to the condition of FIG. 2, to form internal threads 12 centered about axis 13, and to form also a short straight cylindrical inner bore 15 centered about axis 13 and radially opposite the serrated portions of the external threads. The diameter of bore 15 may correspond approximately to the major diameter of internal threads 12.

FIGS. 3 and 4 illustrate at 17 a carrier part into which insert 10 is to be installed. This part 17 contains internal threads 18 adapted to mate with external threads 11 of the insert, and centered about an axis 19 which coincides with the previously mentioned axis 13 in the installed condition of the insert. At the axially outer end of threads 18, there is formed in carrier part 17 a straight cylindrical bore or passage wall 20, which may have a diameter corresponding to the major diameter of external threads 11 of the insert. This cylindrical surface 20 may have an axial extent corresponding approximately to the axial extent of the serrated portion of the insert.

In the figures, the initial major diameter of external threads 11 of the insert is designated by the letter $a$. Similarly, the initial major diameter of internal threads 18 within the carrier part, and the initial diameter of bore 20 within the carrier part, are designated by the same letter $a$. Prior to installation of the insert within the carrier part, the serrated portion of the insert is expanded to a diameter $c$ which is slightly greater than diameter $a$ of the bore 20 in the carrier part. This localized expansion of the insert is illustrated in FIG. 3, in which there is represented fargmentarily at 21 a punch or expansion element which is movable downwardly along axis 13 to a position of reception within counterbore 15 in the insert. As will be understood, punch 21 is externally cylindrical, having a diameter $d$ which is slightly greater than the initial internal diameter $b$ of counterbore surface 15 in the insert, so that the punch acts to expand the upper serrated portion of the insert, through the axial extent of bore 15, from diameter $b$ to diameter $d$, to simultaneously expand the maximum diameter peak portions 22 (FIG. 6) of the serrations 16 from initial diameter $a$ to increased diameter $c$.

After the insert has reached the locally serrated and locally expanded condition of FIG. 3, it is ready for installation in the carrier part. The insert may be installed within the carrier part by means of a tool such as that illustrated at 23 in FIG. 4, having threads 24 adapted to be screwed into and mate with internal threads 12 in the insert. At the upper end of threads 24, tool 23 may have a portion defining a transverse shoulder 25 adapted to bear against end surface 26 of the insert to limit the extent to which the insert may be screwed onto the threaded shank of the tool. The insert is merely turned onto the shank of the tool by hand, following which the tool is energized to screw the insert into the carrier part to the FIG. 4 fully installed position. During the final stages of this threaded advancement of the insert into the carrier part, the slightly enlarged serrations at the axially outer end of the insert engage inner cylindrical surface 20 within the carrier part, and since they are of a diameter slightly greater than surface 20, the serrations cause substantial frictional resistance to turning of the insert within the carrier part. After the insert reaches the FIG. 4 position, the tool 24 is reversed in direction, to unscrew threads 24 from within the insert, while leaving the insert in the carrier part. During this unscrewing rotation of the tool, the frictional engagement of expanded serrations 16 with surface 20 acts to effectively hold the insert against unscrewing rotation with the tool, so that the insert cannot unintentionally be withdrawn from part 17.

Following removal of tool 23 from the insert, the serrated portion of the insert is again expanded (FIG. 5) from diameter $c$ to a still further expanded diameter $e$. This expansion is effected by means of a second punch or expanding tool represented at 27 in FIG. 5. As will be apparent from FIG. 5, diameter $e$ is great enough to cause the peaks 22 of the serrations to bite relatively deeply into the initially cylindrical surface 20 within the carrier part, to thereby greatly increase the holding effectiveness of the serrations, and prevent turning movement of the insert relative to the carrier part under any conditions of use which may subsequently be encountered.

FIG. 7 represents fragmentarily a slightly variational form of insert embodying the invention, as the insert appears prior to installation within a carrier part, that is, in a condition corresponding to that illustrated in FIG. 3 for the first form of the invention. The FIG. 7 insert may be identical with that of FIG. 3, except that it is expanded by a tapering expanding tool or punch 21', instead of the punch 21 of FIG. 3. This tapering punch has a frusto-conical outer surface 28, which expands the serrated end portion of insert 10' from a condition in which the inner surface of this portion is cylindrical as represented at 15' to the full line expanded condition in which this inner surface is enlarged to the frusto-conical configuration represented at 15''. Externally, this expansion causes the serrated peaks 22' to increase in diameter from an initial diameter $a'$ (corresponding to diameter $a$ of the first form of the invention) to a condition in which the peaks lie in or define a flaring cone designated $c'$ in FIG. 7, so that the peaks 22' project outwardly substantially farther than the major diameter $a'$ of most of the threads on the outside of the insert.

In using the insert of FIG. 7, it may be installed in the same manner discussed in connection with FIGS. 4 and 5, with the expanded serrations acting to frictionally engage and slightly bite into wall surface 20 of the carrier part, or a substituted frusto-conical surface in the carrier part, to prevent the insert from being unscrewed by the tool during removal of the tool from the insert. After the tool has been withdrawn, the serrated portion of the insert may be further expanded by another typically frusto-conical punch, as to the condition represented in broken lines at 29 in FIG. 7, to bite deeply into the carrier part and positively prevent removal of the insert under any conditions which may be encountered. Also, a straight cylindrical rather than frusto-conical punch, such as that shown at 27 in FIG. 5, may if desired be used for the final expanding operation of FIG. 7, with the ultimate condition of the insert then being similar to that illustrated in full lines in FIG. 5.

What is claimed as new is:

1. The method that includes forming internal and external threads on a generally tubular side wall of an insert body which is to be screwed into a recess in a carrier part, serrating a first portion of the external threads prior to installation of the insert within the recess, as a separate step at some time prior to installation of the insert within said recess exerting force radially outwardly against the radially inner surface of said tubular side wall at a location radially opposite said first portion of the external threads and thereby expanding said inner surface of said side wall and the side wall itself at said location to an increased dimension and correspondingly expanding said first portion of the external threads to an increased external diameter greater than that of a second axially offset portion thereof, and greater than that of a predetermined portion of said recess which is to receive said serrated portion of the external threads, then screwing said body into said recess in a carrier part with said expanded serrated portion of the external threads frictionally engaging and biting slightly into said predetermined portion of the recess as the body is screwed thereinto to thereby retain said body against accidental removal from the recess, and then exerting additional force radially outwardly against said inner surface and thereby further expanding said inner surface and side wall and expanding said serrated portion of the external threads into tighter frictional engagement with the carrier part.

2. The method as recited in claim 1, including the step of shaping said inner surface of said body to form an unthreaded counterbore in the body which extends essentially axially and is radially opposite said serrated first portion of the external threads, and exerting said first mentioned radially outward force and said additional radially outward force against said counterbore.

3. The method as recited in claim 1, including the step of shaping said predetermined portion of said recess in the carrier part as an essentially axially extending unthreaded counterbore, into which said serrated portion of the external threads is expanded.

References Cited by the Examiner

UNITED STATES PATENTS

| 1,966,520 | 7/1934 | Rayner | 85—64 |
| 2,637,361 | 5/1953 | Nagel | 151—14 |
| 2,750,979 | 6/1956 | Jewett. | |
| 3,081,808 | 3/1963 | Rosan | 151—41.73 |

EDWARD C. ALLEN, *Primary Examiner.*